US006674744B1

(12) United States Patent
Doshi et al.

(10) Patent No.: US 6,674,744 B1
(45) Date of Patent: Jan. 6, 2004

(54) POINT-TO-POINT DATA TRANSPORT OVER THE INTERNET UTILIZING LABEL SWITCHING WITHOUT IP HEADERS

(75) Inventors: Bharat Tarachand Doshi, Holmdel, NJ (US); Enrique Hernandez-Valencia, Highlands, NJ (US); Kotikalapudi Sriram, Marlboro, NJ (US); Yung-Terng Wang, Marlboro, NJ (US); On-Ching Yue, Middletown, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/158,693

(22) Filed: Sep. 22, 1998

(51) Int. Cl.$^7$ ............................................... H04L 12/66
(52) U.S. Cl. ................... 370/352; 370/392; 370/395.1; 370/401
(58) Field of Search ............................... 370/352, 389, 370/392, 401, 395.1, 387

(56) References Cited

U.S. PATENT DOCUMENTS

| | | | | |
|---|---|---|---|---|
| 6,055,561 A | * | 4/2000 | Feldman et al. | 709/200 |
| 6,069,890 A | * | 5/2000 | White et al. | 370/352 |
| 6,252,853 B1 | * | 6/2001 | Ohno | 370/242 |
| 6,292,479 B1 | * | 9/2001 | Bartholomew et al. | 370/352 |
| 6,295,296 B1 | * | 9/2001 | Tappan | 370/392 |
| 6,304,567 B1 | * | 10/2001 | Rosenberg | 370/356 |
| 6,341,127 B1 | * | 1/2002 | Katsube et al. | 370/352 |

OTHER PUBLICATIONS

"Anomalies Due to Delay and Loss in AAL2 Packet Voice Systems: Performance Models and Methods of Mitigation"; Kotikalapudi Sriram, Terry G. Lyons and Yung–Terng Wang: INFORMS Telecommun. Conf., Boca Raton, FL, Mar. 8–11, 1998.

"A New ATM Adaptation Layer for Small Packet Encapsulation and Multiplexing"; John H. Baldwin, Behram H. Bharucha, Bharat T. Doshi, Subrahmanyam Dravida and Sanjiv Nanda; Bell Labs Technical Journal, vol. 2, No. 2, Spring 1997.

* cited by examiner

*Primary Examiner*—Alpus H. Hsu
*Assistant Examiner*—Roberta A. Stevens

(57) ABSTRACT

The specification relates to a device and method utilized for packaging voice data (and other delay critical 'connection' or 'flow' type application data) for point-to-point transport from one Packet Circuit Gateway (PCG) to a second PCG over Label Switching Routers (LSRs) within an Internet Protocol (IP) network; the beneficial aspects of the packaging format being: (i) a reduced overhead requirement when compared to conventional IP telephony due to inclusion of a switching label in lieu of an appended IP header, thereby increasing network bandwidth efficiency, and (ii) the increased transport speed associated with layer two label switching when compared to layer three forwarding.

27 Claims, 2 Drawing Sheets

POINT-TO-POINT DATA TRANSPORT OVER THE INTERNET UTILIZING LABEL SWITCHING WITHOUT IP HEADERS

FIELD OF THE INVENTION

The present invention relates to the field of Internet Telephony, and more particularly to telephony and other delay critical flows of application data for transport over the Internet.

BACKGROUND OF THE INVENTION

Real time transmission of voice over the Internet, also known as Internet telephony, is attracting a great deal of attention as an emerging method of communication. Despite the fact that the Internet does not presently provide a Quality of Service (QoS) guarantee for voice transmission, the use of Internet telephony is expected to increase rapidly over the next several years. Therefore, it would seem that to a large degree, many consumers are amenable to tolerating the reduced voice quality and slight delay associated with Internet telephony (without a QoS guarantee) in exchange for relatively inexpensive long distance voice communications. However, telecommunications carriers would nonetheless desire a means for implementing a QoS guarantee in anticipation of future customer demand for improved quality Internet telephony. Furthermore, a great deal of effort and resources are currently being expended in order to establish QoS guarantees for Internet telephony. For example, various groups within the Internet Engineering Task Force (IETF) are working to establish QoS or QoS-like standards for Internet telephony (including the RSVP, DiffServ, and QoS-Routing working groups).

One current method for transporting voice over the Internet is to package voice data at an Internet Telephony Gateway (ITG), for transport over the Internet within an Internet Protocol (IP) packet. IP packets are comprised of an IP payload (that portion of the packet containing the information or data which is to be transported) and an IP header (appended overhead, utilized for, inter alia, forwarding the respective IP packet along IP-based routers from source to destination).

Additionally, there exists added overhead in the protocol stacks appended to and associated with each IP packet. For instance, IP packets carrying voice communication data typically are appended with RTP (Real-Time Protocol) and UDP (User Datagram Protocol) headers within their protocol stacks. Therefore, the data-overhead transport efficiency associated with current methods of voice transport over the Internet is correspondingly low. For example, when RTP and UDP are utilized in the protocol stack associated with a 10-byte voice payload, the corresponding overhead associated with each IP packet is 80% (12 bytes for RTP and 28 bytes for UDP).

Yet other disadvantages exist (in addition to data-overhead transport inefficiency) in conjunction with the utilization of IP forwarding techniques when applied to Internet voice transport. IP-based routers forward (route) IP packets based on each packet's destination address. Therefore each IP packet header is parsed at a controlling microprocessor in each IP-based router through which a packet is forwarded. The destination address associated with each respective packet is accessed by the microprocessor and a forwarding lookup table is utilized to forward the IP packet to a next router. Despite advances associated with processor speeds, the performance of forwarding algorithms and functions for each IP packet at each IP router utilizes precious router processing capacity and consequently limits the forwarding capacity of the routers.

Recently, scalability has been improved using switched routers in which multiple input ports associated with each router store the forwarding lookup tables and the corresponding forwarding decisions are made when an IP packet arrives at an input port. Thus, a portion of the IP packet processing burden is shifted from the main router microprocessor to additional processors (or hardware) residing at the router input ports; thereby resulting in increased router processing capacity. Switch matrixing is used to convey the IP packet from the input port to an appropriate output port.

Yet another approach for improving the forwarding capacity for an IP router is through the use of label switching. Label switching is efficiently applied to "connection-like" applications for IP packet transport within an MPLS (Multi-Protocol Label Switching) network incorporating Label Switching Routers (LSRs). A Label Switching Router (LSR) is a router operable to forward IP packets conventionally (i.e., via layer three forwarding; comprising the steps of parsing the IP header for each packet, accessing the destination address within the IP header utilizing the router processor, determining the next router within the network to forward an IP packet to, and conveying the IP packet to that next router) and additionally, is operable to perform layer two switching when a label encapsulates an IP packet. Label switching is accomplished by first identifying groupings or segments of IP packets to be sequentially launched from a PCG (Packet Circuit Gateway) or ITG (Internet Telephone Gateway). These groupings or segments are characterized as having IP packets which regularly 'flow' from a source to a destination (e.g., IP packets sharing the same source and destination addresses and/or port identification) for an extended period of time. At the PCG or ITG, the leading edge (first IP packet in a segment which will flow from a source to a destination) is identified and a label is appended to it and each subsequent IP packet corresponding to the same aggregate flow of IP packets (i.e., IP packets belonging to the same grouping or segment). IP packets encapsulated with switching labels are switched at each respective LSR input port (instead of being forwarded by the LSR main processor). A switching path for each labeled IP packet is determined by comparing label path information to a resident lookup table at the input port for each LSR. Each IP packet corresponding to the same aggregate flow has a label codifying the same corresponding network path information. Therefore, each IP packet corresponding to the same aggregate flow segment is switched (mapped) through the same LSRs (i.e., thereby each traversing the same path through the Internet). When a labeled IP packet reaches the point of egress (destination PCG or ITG), each corresponding label is removed and the IP packet (IP header and IP payload) is forwarded to its destination using conventional layer three IP forwarding techniques.

Layer two label switching significantly increases forwarding speed when compared to layer three forwarding. In particular, explicit route selection and QoS based routing are simpler to implement utilizing layer two label switching when compared to conventional layer three IP forwarding. Enablement of the label switching process is dependent upon establishing a label convention prior to use and supplying each LSR and edge device (e.g., PCGs and ITGs) with the appropriate label switching convention (in the form of look-up tables).

Appending a switching label to encapsulate an IP packet, of course, incurs yet additional overhead when compared to conventional IP forwarding. Therefore, while label switching provides significantly increased switching speeds when compared to conventional IP forwarding techniques, the deleterious effects associated with the accompanying data-overhead transport inefficiency (even more overhead occurred with the addition of an appended label) remain. Specifically, the deleterious effects associated with large overheads in a voice transport system are voice delay and jitter. Attempting to increase the data packed into each IP packet would, of course, correspondingly decrease the percentage of overhead utilized per unit of voice data transported. However, the delay/jitter associated with each respective connected call would increase due to data gathering delays.

SUMMARY OF THE INVENTION

The present invention is a device and method for packaging voice data, and other delay critical flows of application data, for point-to-point transport from one Packet Circuit Gateway (PCG) to a second PCG over Label Switching Routers (LSRs) within an Internet Protocol (IP) network; the beneficial aspects of the invention including: (i) a reduced overhead requirement when compared to conventional IP telephony due to inclusion of a switching label in lieu of an appended IP header, thereby increasing network bandwidth efficiency, and (ii) the increased transport speed associated with layer two label switching when compared to layer three forwarding. LSRs are devices within the IP network infrastructure which selectively transport data packets utilizing either (i) layer three forwarding if a received IP packet is not encapsulated with a switching label, or (ii) layer two switching if a received IP packet is encapsulated with a switching label.

The present invention is operable to perform its transport function with packet payloads having only an appended switching label (with no IP packet header) since devices along the entire path between the source PCG (including the source PCG) and the destination PCG (including the destination PCG) are operable to utilize layer two label switching. Advantageously, elimination of the need to append an IP header to data transported over the network and the resulting significant gain in the efficiency of transport of short but delay sensitive packets, is ideally suited to voice and other similar traffic sources.

Alternative embodiments of the present invention further decrease required overhead (and thereby increase transmission bandwidth efficiency) by eliminating the need to repeatedly transmit higher layer protocol stacks typically appended to conventional IP packets. For example, the present invention eliminates the need to repeatedly append such illustrative (but not exhaustive) protocol layers as Real-Time Protocol (RTP), User Datagram Protocol (UDP), and Transmission Control Protocol (TCP), each of which may typically be used in conjunction with IP packet transport.

Yet another alternative embodiment of the present invention, advantageous when compared to prior art IP telephony methods, utilizes a voice frame constructed from a plurality of voice packets. Each of the voice packets within the voice frame has a common source and destination (i.e., the same source PCG and same destination PCG). A switching label is assigned and appended to the entire voice frame and therefore, the fixed switching label overhead is utilized for the transport of a plurality of voice packets in lieu of just a single packet. Thus voice data transport efficiency (bandwidth efficiency) is further improved.

BRIEF DESCRIPTION OF THE DRAWINGS

A more complete understanding of the present invention may be obtained from consideration of the following description in conjunction with the drawings in which.

DETAILED DESCRIPTION

Figure 1:
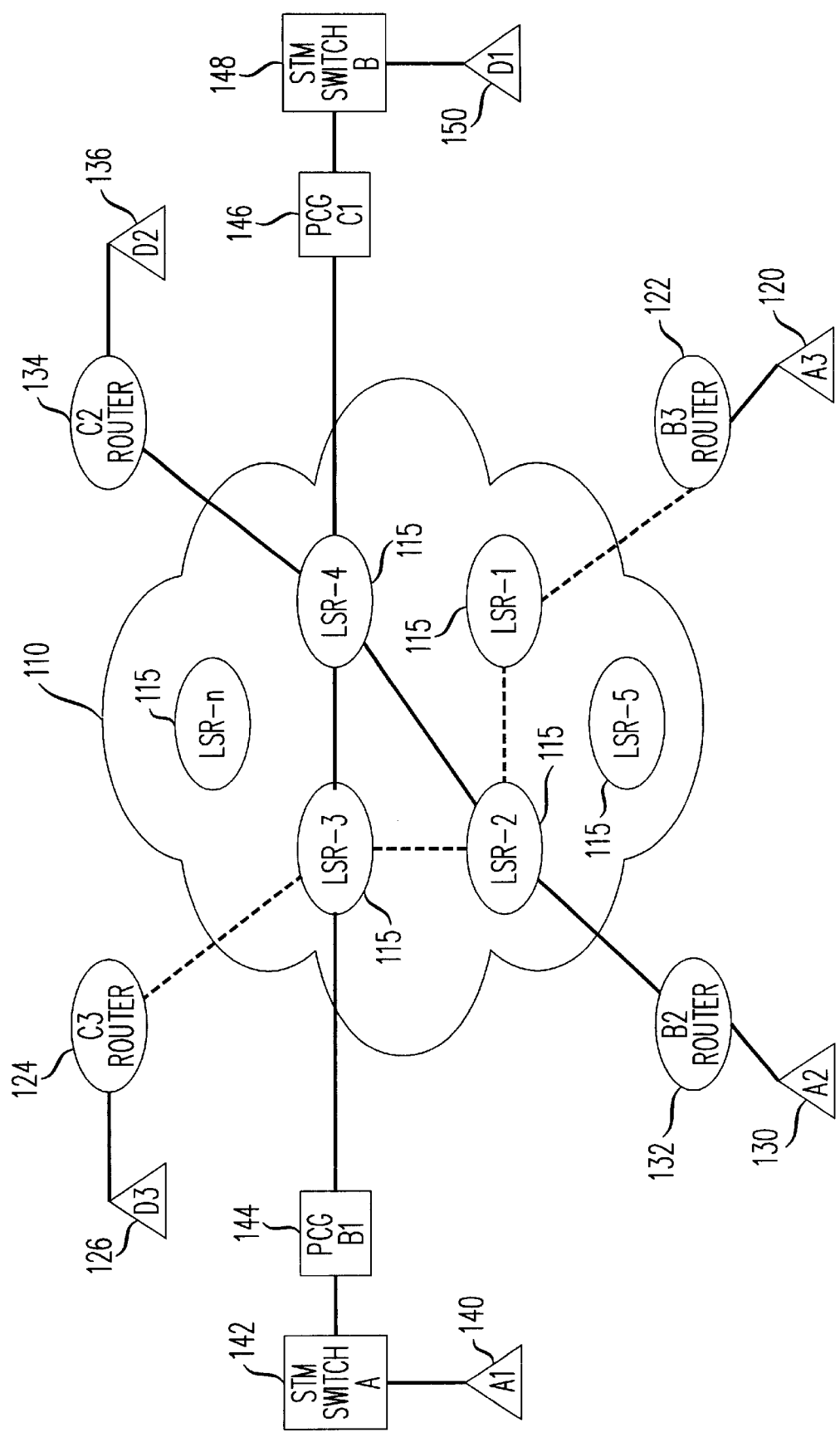
FIG. 1 is a diagram illustrating an exemplary Multi-Protocol Label Switching (MPLS) network operable for transport of conventional IP packets and for transport of labeled voice frames, in accordance with the present invention.

Referring to FIG. 1, there is shown an exemplary Multi-Protocol Label Switching (MPLS) network 110 operable for transport of conventional IP packets and for transport of labeled voice frames, in accordance with the present invention. FIG. 1 is utilized to illustrate three modes for data transport over the MPLS network (typically, a portion of the Internet comprised of interconnected network Label Switching Routers 115).

Label Switching Routers (LSRs) 115 are routers operable to: (i) conventionally forward IP packets and, in addition, (ii) switch an IP packet when presented with a labeled IP packet at an LSR input port. Conventional layer three forwarding is performed by an LSR with its respective processor performing the steps of parsing the IP header for each received packet, accessing the destination address within the IP header utilizing the router processor, determining the next router within the network to forward the IP packet to, and launching the IP packet to that next router. In contrast to layer three forwarding, layer two label switching is performed by simply accessing the label appended to an IP packet at the input port of the LSR receiving the labeled packet, determining which LSR or edge device to send the labeled IP packet to via a lookup table maintained at the receiving LSR input port, and switching and conveying the labeled IP packet to the input port of the next determined LSR or edge device.

Illustrated mode number three is representative of a conventional IP forwarding mode. A representative path for the conveyance of an IP packet from source terminal A3 120 to destination terminal D3 126 is shown. Conventional IP forwarding is performed when an IP packet (comprising an IP header containing a destination address and an IP payload containing the data to be conveyed) is launched from initiating source terminal A3. The IP packet is conveyed to Router B3 122. Router B3 processor then parses the header of the IP packet to determine (utilizing a resident routing algorithm) which next router or LSR 115 to send the IP packet to. The instant example illustrates Router B3 forwarding the IP packet to LSR-1. LSR-1 processor then parses the header of the IP packet to determine (utilizing a resident routing algorithm) which next router or LSR 115 to send the IP packet to. The process is repeated at each next router or LSR until the destination terminal receives the IP packet. In the instant example, the forwarding path is illustrated as Router B3, LSR-1, LSR-2, LSR-3, Router C3 124 and destination terminal D3 126.

Illustrated mode number two is representative of a labeled switching mode for data transport of IP packets. Layer two label switching is an alternative to layer three forwarding which may be used at the LSRs within an MPLS network. Label switching is efficiently utilized for "connection-like" applications to identify and label segments of a "flow" of regularly launched IP packets sharing the same source and destination addresses. Each IP packet within the identified segment of flow has a common source and destination address and is encapsulated with a switching label. The switching label is an additional header which is assigned to provide switching instructions to the input ports of MPLS network LSRs, thus establishing a "connection-like" path through the MPLS network for each successive IP packet within the identified stream or flow. Label switching significantly decreases transport time associated with IP packet delivery when compared to conventional forwarding techniques since there is no need to parse the IP header nor determine a forwarding node for the IP packet when utilizing layer two label switching.

An example of a "connection-like" switched path for labeled IP packets through a plurality of LSRs 115 which comprise an MPLS network is illustrated in FIG. 1; the representative path having a source terminal A2 130 and a destination terminal D2 136. The instant example would be effectively utilized for a "flow" of regularly launched IP packets sharing the same source and destination addresses, such as a long-lived TCP/IP session. IP packets launched from initiating source terminal A2 are received at an edge device, IP Router B2 132 in the instant example. Router B2 appends a header (i.e., switching label), based upon destination address information and designed to establish a label switching path through the MPLS network. Each IP packet included within a flow segment sharing the same source and destination addresses is switched by the LSRs 115 along the same path through the MPLS network. In the instant example, the switching path is illustrated as Router B2, LSR-2, LSR-4, and edge device Router C2 134. Router C2 removes the switching label appended at router B2 and forwards each IP packet, via conventional layer three forwarding, to the next router or destination. With respect to the instant example, router C2 forwards each IP packet to destination terminal D2 136.

A network path is established between a source PCG and a destination PCG over a series of successive pairs of LSRs. The component of the network path that is located between a pair of LSRs is called a path link. For the same network path there may be a separate label value associated with each of the path links which comprise the network path. Determination of label values for layer two switching may be performed for each path link independently by successive pairs of routers along the network path. The establishment of the network path and the determination of label values (and communication of those values between network path components) are typically performed by signaling between the source PCG, the destination PCG, and the intervening LSRs comprising the network path. This signaling is typically performed utilizing a TCP/IP connection.

The advantage associated with layer two label switching of IP packets is that the method significantly increases transport speed through the LSRs 115 within the MPLS network 110. In particular, explicit route selection and QoS based routing are simpler to implement utilizing layer two label switching when compared to conventional layer three IP forwarding. Utilization of the label switching process is dependent upon establishing a label convention prior to use and supplying each LSR 115 and edge device with the appropriate label switching convention (typically in the form of resident look-up tables, as is well-known to those skilled in the art). However, despite the inherent advantages of layer two switching when compared with layer three forwarding, appending a switching label to encapsulate an IP packet incurs yet additional overhead when compared to conventional IP forwarding. Therefore, while label switching provides significantly increased switching speeds when compared to conventional IP forwarding techniques, the deleterious effects associated with the accompanying data-overhead transport inefficiency (even more overhead incurred with the addition of an appended label) remains; especially when applied to Internet telephony. Specifically, the deleterious effects associated with a large overhead in a voice transport system are voice delay and jitter. Attempting to increase the quantity of data packaged within each IP packet would, of course, correspondingly decrease the percentage of overhead utilized per unit of voice data transported. However, the delay/jitter associated with each respective connected call would increase due to data gathering delays.

Advantageously, the present invention reduces the cumbersome overhead requirements associated with conventional IP transport and concomitantly utilizes the beneficial transport speed associated with layer two label switching. Referring once more to FIG. 1, illustrated mode number one is representative of a label switching voice frame mode for point-to-point data transport, in accordance with an exemplary embodiment of the present invention. Terminal units A1 140 and D1 150 are representative of individual voice telephones. The accompanying text describing a connected voice call between units A1 and D1 is referenced to voice transmission from unit A1 to unit D1; however, voice transmission during a connected voice call is typically bi-directional in nature, and transmission in the opposite direction would be accomplished in substantially the same manner, as would be readily apparent to those skilled in the art.

A voice call made from unit A1 for connection to unit D1 is first carried to STM Switch A 142 via Public-Switched Telephone Network (PSTN) lines. STM Switch A is representative of a local exchange which converts analog calls to digital data, multiplexes digital data from a plurality of calls and delivers the multiplexed data via a distribution line (such as a T1 line) to Packet Circuit Gateway (PCG) B1 144. A PCG, also commonly referred to as an Internet Telephone Gateway (ITG), is utilized to convert incoming circuit data (such as that received over a T1 line) to packet data (and conversely, incoming packet data to circuit data when receiving return transmissions). A PCG additionally performs voice processing functions such as compression/decompression, silence removal/insertion, etc. PCG B1 is utilized to establish a "connection-like" switched path for transmission of voice data to PCG C1 146 via the MPLS network 110. The path illustrated in the instant example is through LSR-3 and LSR-4.

Initially, the "connection-like" switching path is negotiated and established between PCG B1 and PCG C1 utilizing conventional IP or IP-like packets having IP headers. However, once a connection flow is established between PCG B1 and PCG C1, voice frames containing voice telephony data are packaged and transported from PCG B1 to PCG C1 without utilizing IP or IP-like headers. Rather, voice frames are switched through network LSRs 115 with an appended switching label. The appended label requires significantly less overhead than a conventional IP header. Unlike the prior art, the present invention does not simply encapsulate an IP packet (having an IP header) with an additional label. Rather, when a voice frame is created at the transmitting PCG, a switching label is created and appended as a portion of each voice frame, in lieu of an IP header. An IP or IP-like header (a forwarding header) is not required in conjunction with the present invention since the MPLS edge devices (PCG B1 and PCG C1) are utilized for point-to-point transport. Each LSR 115 which conveys voice frames, in accordance with the present invention, between PCG B1 and PCG C1 utilizes layer two label switching rather than layer three IP forwarding. Therefore, the voice data being transmitted is not contained within an IP packet, but a specially constructed voice frame having a much greater data-overhead transport efficiency. Details concerning an exemplary architecture for voice frame and switching label construction are subsequently described in conjunction with FIG. 2 and FIG. 3.

Once a voice frame is conveyed to PCG C1, the switching label is removed and voice processing (such as decompression, silence insertion, etc., as previously described in conjunction with PCG functionality) is performed. PCG C1 then converts incoming voice packet data to multiplexed digital circuit voice data and delivers the multiplexed data via a distribution line (such as a T1 line) to STM Switch B 148. STM Switch B is representative of a local exchange which demultiplexes the multiplexed digital circuit voice data into a plurality of digital voice connected calls and then converts the digital data associated with each of the plurality of connected calls to analog signals. STM Switch B then forwards each of the analog signals to the appropriate subscriber telephone units associated with each of the plurality of connected calls being serviced from STM Switch B; in the instant example the analog voice signal which originated from terminal unit A1 140 is delivered to terminal unit D1 150.

Figure 2:
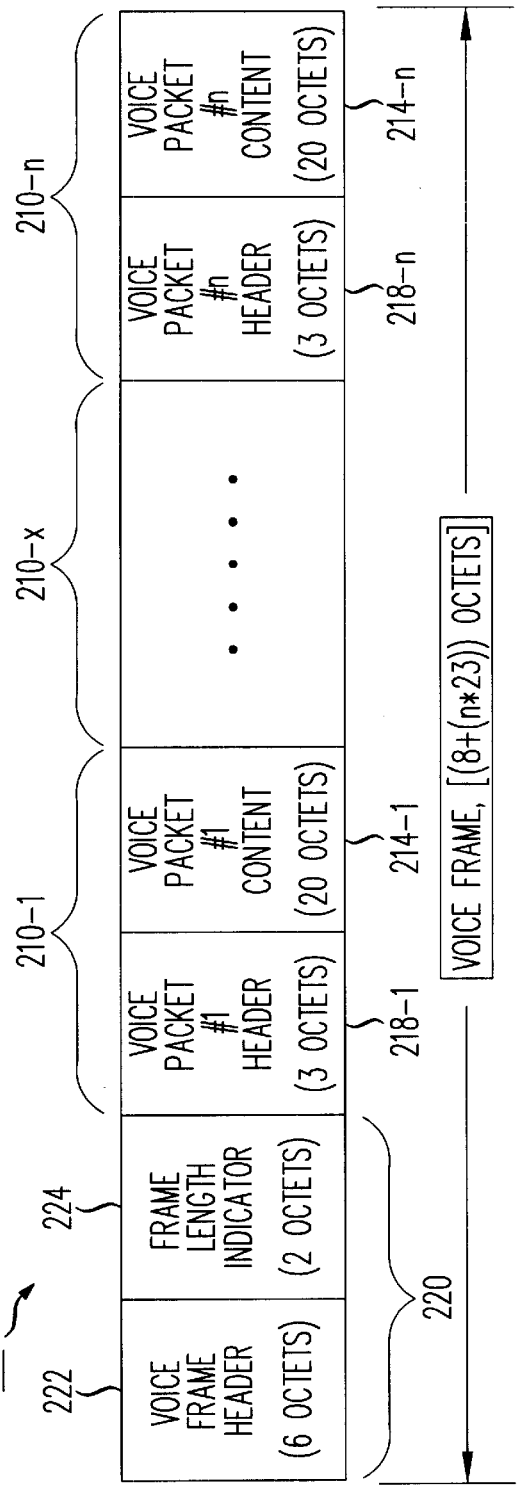
FIG. 2 is a diagram illustrating an exemplary voice frame structure, including a plurality of voice packets, a voice frame header, and a frame length indicator, in accordance with the present invention.
Figure 3:
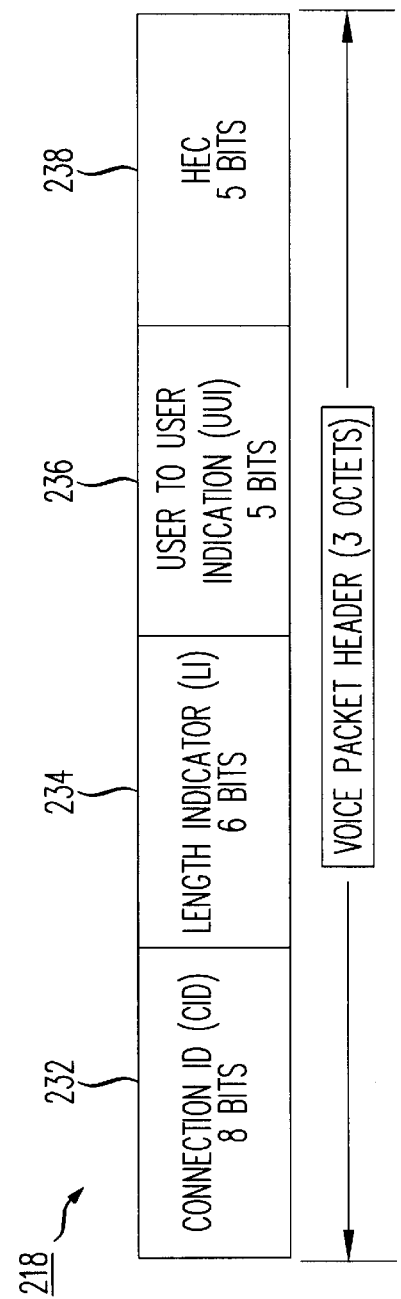
FIG. 3 is a diagram illustrating an exemplary structure for a voice packet header, in accordance with the present invention.

Details of the architecture and construction of labeled voice frames, presented as exemplary embodiments of the present invention, are described in conjunction FIG. 2 and FIG. 3. A labeled voice frame 200 is comprised of a plurality of voice packets 210 with an appended switching label 220. The switching label 220 includes at least a label switching header 222 to enable label switching through the LSRs of an MPLS network. In accordance with the embodiment of the present invention as illustrated in FIG. 2, a frame length indicator 224 is also provided within the switching label 220. Also illustrated are n voice packets 210, each voice packet 210 comprised of a voice packet. payload 214 and a voice packet header 218. Exemplary bit lengths for each of the associated fields within a voice frame 200 include: individual voice packet payloads 214 of 20 octets, voice packet headers 218 of 3 octets, the frame length indicator 224 is 2 octets and the label switching header is 6 octets. Each of these exemplary bit lengths are merely illustrative of embodiments of the present invention and it would be apparent to those skilled in the art that bit length variations may be made to each of the associated fields within a voice frame 200.

An exemplary embodiment of a voice packet header 218 is illustrated in FIG. 3. The voice packet header 218 associated with each respective voice packet payload 214 is utilized to provide various packet specific information and functionality. The instant illustrated voice packet header 218 is shown as being comprised of four fields; an eight bit Connection ID (CID) field 232, a six bit length indicator (LI) field 234, a 5 bit User-to-User Indication (UUI) field 236, and a 5 bit Header Error Correction (HEC) field 238. The eight bit CID field 232 is used to identify up to 256 individual voice channels imbedded in its associated payload 214. The six bit LI field 234 delineates voice packet payload length 214 up to 63 octets. The five bit UUI field 236 is used to communicate UUI messages (for each individual connection) regarding voice coding type and sequence numbers associated with call connections represented within the voice packet payload 214. The described exemplary length of fields within the voice packet header are merely illustrative of embodiments of the present invention. It would be apparent to those skilled in the art to vary individual field lengths, or to eliminate a specific field altogether when its function is not required, to provide the appropriate degree of information and/or functionality.

The advantages associated with use of the present invention may be best illustrated by determining the efficiency of the voice frame architecture of an exemplary embodiment of the present invention if a conventional protocol stack and label encapsulation where to be added to that architecture; and then compare that value to the efficiency of the same exemplary embodiment of the present invention with no protocol stack and only a switching label appended. If voice packets 210, described as a portion of the present invention, were assembled to include conventional layer three forwarding capabilities in addition to layer two switching capabilities, then each voice frame would contain the additional overhead presently associated with IP packet telephony. That is, each packet would include an IP header, an User Datagram Protocol (UDP) header and frequently a Real-Time Protocol (RTP) header. The IP header length is 20 octets, the UDP header length is 8 octets, and the RTP header length is 12 octets. In order to keep the packetization delay small, especially at high voice compression ratios using low bit-rate voice coding, the packet length would be necessarily small. For example, with a voice coding rate of 8 kbps, a twenty octet packet requires 20 msecs of sampling to supply adequate data for packetization. In accordance with the present invention, a twenty octet voice packet payload 214 would be carried in a 23 octet voice packet 210, including its three octet voice packet header 218. Prior art forwarding (or switching utilizing conventional label encapsulation in addition to an included IP header) would require additional overhead as well for transport. Placing one voice packet within each conventional IP packet involves either 31 octets (without incorporation of RTP) or 43 octets (incorporating RTP) of header for 20 octets of voice samples. Therefore, less than one third of the total capacity used for transport is apportioned to the data payload when RTP is incorporated. Even if multiple voice packets (for example, eight voice packets from eight different call connections) are utilized in an attempt to increase delivery efficiency (a feature of the present invention not included as an aspect the prior art, but postulated here to demonstrate that even if multiple voice packets were utilized in conjunction with the prior art, the efficiency would still be significantly less than that associated with the present invention), an IP packet utilized for voice transport would still require 52 octets (without RTP) or 64 octets (with RTP) of overhead for 160 octets of corresponding voice samples, still utilizing over 25% of available capacity for overhead. Thus, for voice transport using conventional IP routing, not only are high overheads responsible for consuming valuable bandwidth in the IP network, but also IP forwarding delay adds to the end-to-end delay affecting the delay/jitter performance critical for voice traffic. Therefore, pure label switching (without the accompanying overhead associated with IP, UDP, and RTP headers), in accordance with the present invention, is utilized for voice traffic transport over the LSRs in an MPLS network, from edge device to edge device for point-to-point delivery.

Since voice calls are long-lived and there are typically a continuous supply or 'flow' of voice packets transported between a pair of gateway endpoints (PCGs or ITGs), the present invention effectively uses label switching (without the attendant protocol header stacks previously utilized with or without label encapsulation) for delivery of voice traffic between gateways. Conventional encapsulated label switching within an IP subnetwork does increase transport speed when compared with IP forwarding; however, the conventional technique of merely encapsulating an IP packet with a switching label further adds to the overhead requirement and therefore reduces the transmission efficiency further. Since the PCGs creating and generating (and receiving) voice packets are edge devices which directly access the LSRs within the MPLS network (with no dependence upon IP-forwarding-only-routers), the present invention does not require the protocol header stack previously used (IP, UDP, RTP headers) for conveyance between the edge devices. Thus, a switching label 220 (eight octets in length, for example, as in FIG. 2) appended to a collection of voice packets 210 (for example, eight packets) represents a significant improvement in delivery efficiency over the prior art. If a voice packet length is established as twenty-three octets (twenty octets for voice payload 214 and three octets for voice packet header 218), then the total voice data contained in payload is 160 octets (8*20 octets) and the total overhead is 32 octets (8 octets plus 8*3 octets). Therefore, the total data delivery efficiency utilizing an exemplary embodiment of the present invention is better than 83% (less than 17% total overhead).

Thus, utilization of pure label switching in conjunction with multiple connection voice packets with small packet sizes, in accordance with the present invention, allows for improved efficiency and/or delay without losing any functionality. Moreover, the present invention allows for existing IP infrastructure to support multiple traffic types efficiently and provide low delay/jitter operation for voice. Of course, in addition to voice transport, other long-lived flows (such as MPEG 2 video streams over IP and medical imaging applications over IP) which do not depend on IP forwarding outside of the IP backbone will also benefit from pure label switching capability in routers in a similar way, as would be apparent to those skilled in the art.

Numerous modifications and alternative embodiments of the invention will be apparent to those skilled in the art in view of the foregoing description. For example, one alternative embodiment of the present invention incorporates edge device Packet Circuit Gateways (PCGs) within LSRs located at the edges of a specified network path. This embodiment may be implemented by co-locating the PCG edge device with the respective LSR, or in the alternative, by integrating PCG function within the respective LSR.

Although the present invention has been described in the context of voice calls originating and terminating at a conventional telephone and entering the IP network via a PSTN or PBX switch, it is also equally applicable to embodiments in which voice calls originate from a PC and enter the IP network as packetized voice data. Similarly, the present invention is also equally applicable to embodiments in which voice calls exit the IP network and terminate at a PC as packetized voice data. When voice calls originate or terminate at a PC, functions such as packetization/depacketization, coding/decoding, silence elimination/insertion are enabled via well known supporting applications resident at the originating or terminating PC.

Accordingly, this description is to be construed as illustrative only and is for the purpose of teaching those skilled in the art the best mode of carrying out the invention and is not intended to illustrate all possible forms thereof. It is also understood that the words used are words of description, rather than limitation, and that details of the structure may be varied substantially without departing from the spirit of the invention and the exclusive use of all modifications which come within the scope of the appended claims are reserved.

What is claimed is:

1. A method for conveyance of voice data from a Packet Circuit Gateway (PCG) within an Internet Protocol (IP) based network having a plurality of Label Switching Routers (LSRs), said method comprising the steps of:

assigning a value for a switching label based upon a determined (MPLS) Multi-Protocol Label Switching network path;

packaging a plurality of said voice data within a voice packet payload;

appending said switching label to said voice packet payload to form a voice frame; and launching said voice frame from said PCG for transport through said IP based network along the determined MPLS network path, wherein said voice frame does not include an IP header.

2. The method in accordance with claim 1 further characterized in that said voice frame does not include a User Datagram Protocol (UDP) header.

3. The method in accordance with claim 2 further characterized in that said voice frame does not include a Real-Time Protocol (RTP) header.

4. The method in accordance with claim 1 further characterized in that said voice frame is comprised of a plurality of voice packet payloads.

5. The method in accordance with claim 4 further characterized in that each of said plurality of voice packet payloads is appended to a corresponding voice packet header, said voice packet header comprised of a field conveying voice packet payload length information.

6. The method in accordance with claim 4 further characterized in that each of said plurality of voice packet payloads is appended to a corresponding voice packet header, said voice packet header comprised of a field conveying particular connection identification (CID) information.

7. The method in accordance with claim 1 wherein said step of determining said value for said switching label is accomplished via a conventional TCP/IP connection.

8. The method in accordance with claim 6 wherein said step of assigning said value for said switching label is accomplished utilizing a look-up table resident at said PCG.

9. The method in accordance with claim 1 further characterized in that said IP based network is a Multi-Protocol Label Switching (MPLS) network.

10. The method in accordance with claim 1 further characterized in that said method is also further operable for conveyance of MPEG video stream data in addition to said voice data.

11. The method in accordance with claim 1 wherein said PCG is incorporated within a Label Switching Router edge device.

12. A method for conveyance of a plurality of voice data from a first Packet Circuit Gateway (PCG) over a plurality of Label Switching Routers (LSRs) within a Multi-Protocol Label Switching (MPLS) network and to a second PCG, said method comprising the steps of:

negotiating a data link between said first PCG and said second PCG utilizing al conventional TCP/IP connection over said plurality of LSRs within said MPLS network, said negotiated data link establishing a desired path through said plurality of LSRs;

assigning a value for a switching label based upon a first path link within said desired path through said plurality of LSRs;

processing said plurality of said voice data utilizing voice data compression techniques, thereby producing a plurality of processed voice data, packaging a portion of said plurality of said processed voice data within each of a plurality of voice packet payloads;

appending to each of said plurality of voice packet payloads a voice packet header, thereby creating a plurality of voice packets;

concatenating said plurality of voice packets;

appending said switching label to said concatenated plurality of voice packets to form a voice frame; and launching said voice frame from said first PCG for transport over said desired path through said plurality of LSRs within said MPLS network to said second PCG, wherein said voice frame does not include an Internet Protocol (IP) header.

13. The method in accordance with claim 12 further characterized in that said voice frame does not include a User Datagram Protocol (UDP) header.

14. The method in accordance with claim 13 further characterized in that said voice frame does not include a Real-Time Protocol (RTP) header.

15. The method in accordance with claim 14 wherein said voice packet header includes a connection identifier field utilized to identify each of a plurality of connected calls which comprise ones of said plurality of voice packet payloads.

16. The method in accordance with claim 14 wherein said voice packet header includes a voice packet payload length indicator field corresponding to a length associated with ones of said plurality of voice packet payloads.

17. The method in accordance with claim 15 wherein said voice packet header further includes a voice packet header error correction field.

18. The method in accordance with claim 17 wherein said step of assigning said value is accomplished via a conventional TCP/IP connection.

19. A device for conveyance of voice data from a Packet Circuit Gateway (PCG) within an Internet Protocol (IP) based network having a plurality of Label Switching Routers (LSRs), said device comprising:

means for assigning a value for a switching label based upon a predetermined (MPLS) Multi-Protocol Label Switching network path, means for packaging a plurality of said voice data within a voice packet payload;

means for appending said switching label to said voice packet payload to form a voice frame; and means for launching said voice frame from said PCG for transport through said IP based network along the predetermined MPLS network path, wherein said voice frame does not include an IP header.

20. The device in accordance with claim 19 further characterized in that said voice frame does not include a Real-Time Protocol (RTP) header.

21. The device in accordance with claim 20 further characterized in that said voice frame does not include a User Datagram Protocol (UDP) header.

22. The device in accordance with claim 21 further characterized in that said voice frame is comprised of a plurality of voice packet payloads.

23. The device in accordance with claim 22 further characterized in that each of said plurality of voice packet payloads is appended to a corresponding voice packet header, said voice packet header comprised of a field conveying particular connection identification (CID) information.

24. The device in accordance with claim 23 wherein said means for assigning said value for said switching label is negotiated utilizing a conventional TCP/IP connection.

25. The device in accordance with claim 24 wherein said means for determining said value for said switching label is further accomplished utilizing a look-up table resident at said PCG.

26. The device in accordance with claim 25 further characterized in that said IP based network is a Multi-Protocol Label Switching (MPLS) network.

27. The device in accordance with claim 25 further characterized in that said device is also further operable for conveyance of MPEG video stream data in addition to said voice data.

* * * * *